United States Patent
Reidy et al.

(10) Patent No.: US 11,298,668 B2
(45) Date of Patent: Apr. 12, 2022

(54) PROCESS TO PRODUCE NANOPARTICLES

(71) Applicant: BLH ECOLOGY CONCEPTS, LLC, Tolar, TX (US)

(72) Inventors: Richard Francis Reidy, Denton, TX (US); John E. Lott, Weatherford, TX (US); Gerhardt E. Wissler, Benbrook, TX (US); Mark C. Hill, Ponte Vedra Beach, FL (US)

(73) Assignee: BLH ECOLOGY CONCEPTS, LLC, Tolar, TX (US)

( * ) Notice: Subject to any disclaimer, the term of this patent is extended or adjusted under 35 U.S.C. 154(b) by 5 days.

(21) Appl. No.: 16/762,168

(22) PCT Filed: Nov. 8, 2018

(86) PCT No.: PCT/US2018/059743
§ 371 (c)(1),
(2) Date: May 7, 2020

(87) PCT Pub. No.: WO2019/094540
PCT Pub. Date: May 16, 2019

(65) Prior Publication Data
US 2020/0354224 A1    Nov. 12, 2020

Related U.S. Application Data

(60) Provisional application No. 62/583,889, filed on Nov. 9, 2017.

(51) Int. Cl.
*B01J 3/00* (2006.01)
*B01J 2/26* (2006.01)
(Continued)

(52) U.S. Cl.
CPC ............... *B01J 3/008* (2013.01); *B01J 2/02* (2013.01); *B01J 2/26* (2013.01); *B01J 19/22* (2013.01); *B01J 19/28* (2013.01); *C01B 32/55* (2017.08)

(58) Field of Classification Search
None
See application file for complete search history.

(56) References Cited

U.S. PATENT DOCUMENTS

| | | |
|---|---|---|
| 2006/0153921 A1 | 7/2006 | Chattopadhyay et al. |
| 2009/0202646 A1 | 8/2009 | Kim et al. |

(Continued)

FOREIGN PATENT DOCUMENTS

KR    100801562 B1 *  2/2008

OTHER PUBLICATIONS

Ranjit Thakur and Ram B. Gupta. Rapid Expansion of Supercritical Solution with Solid Cosolvent (RESS-SC) Process: Formation of Griseofulvin Nanoparticles. Ind. Eng. Chem. Res. 2005, 44, 7380-7387. (Year: 2005).*

(Continued)

*Primary Examiner* — Jennifer A Leung
(74) *Attorney, Agent, or Firm* — Renner, Otto, Boisselle & Sklar, LLP

(57) ABSTRACT

A process for producing nanoparticles of a substance, including in a first chamber, forming a dispersion of a substance in a fluid and bringing the fluid into a supercritical state; passing the dispersion from the first chamber through a cooling device or into a cooling zone in a second chamber, wherein the cooling device or cooling zone configured to reduce temperature of the dispersion below a temperature at which the fluid forms solid particles such that nanoparticles of the substance are formed, wherein the second chamber comprises a surface configured to receive the solid particles (Continued)

of the fluid and the nanoparticles of the substance; allowing pressure to decrease and/or temperature to increase in the second chamber to transform the solid particles into a gaseous state, removing the fluid in the gaseous state and with the nanoparticles remaining on the surface; and collecting the nanoparticles from the surface.

14 Claims, 1 Drawing Sheet

(51) Int. Cl.
  *B01J 2/02* (2006.01)
  *B01J 19/28* (2006.01)
  *B01J 19/22* (2006.01)
  *C01B 32/55* (2017.01)

(56) References Cited

U.S. PATENT DOCUMENTS

2011/0016742 A1* 1/2011 Anderson ................. A23L 3/44
  34/287
2016/0244547 A1* 8/2016 Jagannathan ........ A61K 9/5192
2017/0231914 A1  8/2017 Haeggstrom et al.

OTHER PUBLICATIONS

PCT/US2018/059743; PCT International Search Report and Written Opinion of the International Searching Authority dated Feb. 12, 2019.

* cited by examiner

PROCESS TO PRODUCE NANOPARTICLES

The present application is a U.S. National Stage Application based on and claiming benefit and priority under 35 U.S.C. § 371 of International Application No. PCT/US2018/059743, filed 8 Nov. 2018, which in turn claims benefit of and priority to U.S. Provisional Application No. 62/583,889, filed 9 Nov. 2017, the entirety of both of which is hereby incorporated herein by reference.

TECHNICAL FIELD

The present invention relates to a process for producing nanoparticles of a variety of substances. More specifically, the present invention relates to a process for producing nanoparticles of substances by use of a supercritical fluid and a novel method for forming and collecting the produced nanoparticles.

BACKGROUND

To meet the increasing commercial demand for small particles, particularly nanoparticles, and reap the advantages such particles can impart in a growing catalog of applications, a number of methods, both mechanical and chemical, have been developed for the creation of such particles. Growing demand for micronized or nano-sized particles exists in the pharmaceutical, cosmeceutical, and food stuff sectors. Additionally, significant commercial benefits have been identified for micronized or nano-sized particles including among organic, inorganic, ionic and organometallic materials.

Included among the techniques being pursued and refined are a number of processes that utilize the properties and environment of supercritical carbon dioxide ($scCO_2$) in the creation of nanoparticles, the most widely used of which are Rapid Expansion Supercritical Solution (RESS) and Supercritical Anti-Solvent (SAS). For those solutes with reasonable solubility in supercritical $CO_2$, variations in the RESS process predominate. In RESS, the solution is blown through a nozzle to allow a rapid drop in pressure, which results in supersaturation of the solute and a precipitation of solid particles. For those solutes with poor solubility in supercritical $CO_2$, SAS processes predominate. A solution is made in a good solvent which is then rapidly mixed with supercritical $CO_2$. The supercritical $CO_2$ then acts as an antisolvent and removes the original solvent leaving a residue of small solid particles.

Recovery of the final powders remains a limitation to either of these families of processes. In RESS, for solutes with high solubility in $scCO_2$, concentrations in the expanding gas are high and the resulting particles may be larger than desired. If the solubility of the solute is low, then the expansion ratios and supersaturation are high and very small particles are produced. However, this ability to produce very small particles comes at the cost of limited recovery because there is a very low concentration of solid particles in a very large quantity of expanded gas. Typical processes expand into a fixed volume for later recovery of the small particles. These processes also typically create varying sized particles often requiring filtering to separate particles having the desired size from the production stream. The multi-stage requirements of the typical RESS process together with the difficulty in harvesting the small particles often requires extensive filtering and so pose significant obstacles to the establishment of an efficient continuous process. Accordingly RESS processes are predominantly batch and not continuous.

SAS processes suffer from similar limitations. Good solvents are chosen as the initial solvent, but large quantities of $scCO_2$ are needed to strip off all of the solvent and again, very high expansion ratios result. As is the case with RESS processes, the limitations of SAS processes create an environment that is difficult to maintain in a continuous process which would be required for the production of significant volumes of small particles.

Accordingly, a significant need remains for efficient and continuous processes for the production of nanoparticles of a variety of substances.

SUMMARY OF THE INVENTION

The process in accordance with the present invention represents a significant advance in the field of materials science. The first steps of the inventive process are similar to those of the prior art, but in the present invention, new and very efficient steps are provided for the formation and collection of the desired nanoparticles.

The process in accordance with the present invention dissolves a solute in a supercritical fluid, then rapidly expands the dissolved solute to form nanoparticles having submicron particle sizes. Unlike prior art processes, the process of the present invention does not expand the dissolved solute into a low pressure volume, but instead rapidly cools the expanding fluid and particles to a temperature below the temperature at which the fluid, e.g., $scCO_2$, solidifies, and collects the solidified fluid and the produced nanoparticles as solids, and then allows the solidified fluid to sublimate or evaporate into a gas, thus leaving behind the produced nanoparticles in a much smaller area from which collection is more facile than in prior art methods. The rapid cooling has the additional effect of preventing agglomeration of the produced nanoparticles. In this process, using $scCO_2$ as an example, there is an initial rapid expansion of the $scCO_2$ as it is depressurized from the preparation vessel, then the $CO_2$ and the solute are cooled to a temperature below that at which $CO_2$ solidifies, e.g., below −80° C., so the $CO_2$ freezes, using, e.g., liquid nitrogen. This rapid solidification of the $CO_2$ (or other fluid used as the supercritical fluid) into a frozen solid, which can be referred to as snow, prevents any significant particle growth of the nanoparticles. Additionally, due to the solidification of the $CO_2$, the system volume contracts rather than expands, and thereby avoids the complications of the large volume expansion that is present in prior art RESS processes. The solid $CO_2$ is then allowed to sublime, leaving a residue of nanoparticles of the solute. Thus, the nanoparticles are effectively formed and harvested within the same process step.

Further, the process of the present invention can be operated on a continuous basis. To do so, a continuous flow of the supercritical fluid, e.g., $CO_2$, and the solute, together with any needed co-solvent, are provided to the reactor to dissolve the solute, and then the $CO_2$/solute "snow" is blown into a suitable receiver where the $CO_2$ (or other fluid) is allowed to sublime or evaporate and only the particles remain. If a co-solvent to assist solubility is required, only a small amount will be necessary in a continuous flow of $scCO_2$ to dissolve the target solute.

While other prior art processes can make small particles, the process of the present invention greatly simplifies harvesting of the nanoparticles, requiring no filters or secondary recovery vessels. Unlike typical RESS processes, the process of the present invention exploits changes of state—supercritical to gas to solid and back to gas.

One embodiment of the present invention can be described in summary as a continuous process to produce nanoparticles through the dispersion of an organic and/or inorganic substance in a supercritical fluid, subsequent expansion of the dispersion into a cooled environment forming nanoparticles of the organic and/or inorganic substance and forming a solid from the supercritical fluid, and this solid material is sprayed onto a surface from which the supercritical solution is sublimed, leaving only the nanoparticles, which are subsequently collected from this surface.

Thus, in one embodiment the present invention provides a process for producing nanoparticles of a substance, including:

in a first chamber, dispersing a substance in a fluid and bringing the fluid into a supercritical state at a selected pressure and temperature to form a dispersion of the substance and the fluid in the supercritical state;

passing the dispersion from the first chamber through a cooling device or into a cooling zone in a second chamber, wherein the cooling device or cooling zone configured to reduce temperature of the dispersion below a temperature at which the fluid forms solid particles such that nanoparticles of the substance are formed, wherein the second chamber comprises a surface configured to receive the solid particles of the fluid and the nanoparticles of the substance;

allowing at least one of pressure to decrease and temperature to increase in the second chamber such that the solid particles of the fluid are transformed into a gaseous state, removing the fluid in the gaseous state and allowing the nanoparticles to remain on the surface; and collecting the nanoparticles of the substance from the surface.

In one embodiment, the dispersing further includes adding a co-solvent to enhance solubility of the substance in the fluid.

In one embodiment, in the passing, the temperature of the dispersion is reduced below the temperature at which the co-solvent forms a solid.

In one embodiment, in the allowing, the co-solvent evaporates and is removed with the fluid in the gaseous state.

In one embodiment, the surface configured to receive solid particles of the fluid and nanoparticles of the substance is further configured to transport the nanoparticles to a nanoparticle collection zone as the fluid in the gaseous state is removed.

In one embodiment, the surface is disposed upon an endless conveyor or a rotatable drum.

In one embodiment, the collecting comprises scraping the nanoparticles from the surface or lifting the nanoparticles from the surface by suction or electrostatic attraction.

In one embodiment, the process is operated on a continuous basis.

In one embodiment, the fluid is carbon dioxide.

In one embodiment, the process is free of any step of filtration to collect the particles. In one embodiment, the process does include a step of filtration in collecting the particles. It is preferred that no filtration be included in the process, but in some cases, a filtration may be needed.

In one embodiment, the process is free of any added surface modifier in any step of the process.

In one embodiment, the process is free of any added antisolvent in any step of the process. In one embodiment, the process does include use of an antisolvent in forming the nanoparticles or in causing separation of the fluid and any co-solvent from the formed nanoparticles. It is preferred that no antisolvent be employed in the process, but in some cases, an antisolvent may be needed.

In one embodiment, the nanoparticles of the substance have an average size in the range from about 1 nm to about 1000 nm, or wherein the nanoparticles of the substance have an average size in the range from about 50 nm to about 500 nm, or wherein the nanoparticles of the substance have an average size in the range from about 200 nm to about 300 nm.

As shown above and in the following detailed description, the process in accordance with the present invention represents a significant advance in the field of materials science, by providing a new, more efficient and more efficacious process for the production of nanoparticles for use in a variety of applications.

BRIEF DESCRIPTION OF THE DRAWINGS

Example embodiments of the invention are depicted in the drawings to illustrate the principles of the invention, and are not limiting of the scope of the invention, which is limited only by the scope of the claims.

Figure 1:
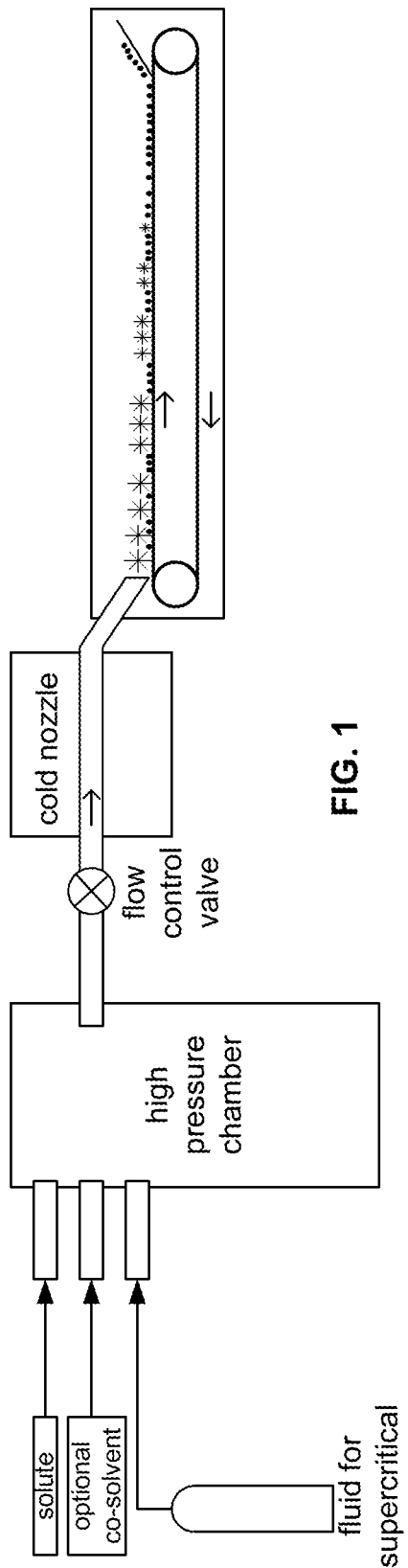
FIG. 1 is a schematic diagram depicting elements of an apparatus for carrying out an embodiment of the present invention.

It should be appreciated that for simplicity and clarity of illustration, elements shown in the Figures have not necessarily been drawn to scale. For example, the dimensions of some of the elements may be exaggerated relative to each other for clarity.

Furthermore, it should be appreciated that the process steps and structures described below do not form a complete process flow for preparing products including the nanoparticles described herein. The present invention can be practiced in conjunction with fabrication techniques currently used in the art, and only so much of the commonly practiced process steps are included as are necessary for an understanding of the present invention.

DETAILED DESCRIPTION

The present invention provides a system for preparing nanoparticles of substances by use of a fluid in a supercritical state that disperses the substance in the fluid in the supercritical state, and then releasing the substance-containing fluid from its supercritical state in a way that results in formation of nanoparticles of the substance and solidification of the fluid onto a surface. Thereafter, the solidified fluid is allowed to sublime or evaporate, and nanoparticles are left behind and can easily be collected for subsequent use.

Many different materials, usually fluids, are capable of reaching a supercritical state, under the proper conditions of pressure and temperature. In the present description, and in the invention overall, the fluid of choice and the fluid used in describing the present invention, is carbon dioxide, $CO_2$. When $CO_2$ is in its supercritical state, it is generally referred to as $scCO_2$. The fluid is exemplified herein as $CO_2$, but also other fluids can be used. The fluid employed in the disclosed process can generally be any of a number of liquefied compressed gases and their mixtures known to the art. These include but are not limited to gaseous oxides such as nitrous oxide; water; alkanes such as ethane, propane, butane, and pentane; alkenes such as ethylene and propylene; alcohols such as ethanol and isopropanol; ketones such as acetone;

ethers such as dimethyl or diethyl ether; esters such as ethyl acetate; halogenated compounds including sulfur hexafluoride, chlorofluorocarbons such as trichlorofluoromethane, dichlorofluoromethane, difluorochloromethane, and fluorocarbons such as trifluoromethane; and elemental liquefied gases such as xenon. Some of the foregoing fluids may also be employed as an optional co-solvent for substances that have low solubility in the fluid in a supercritical state, e.g., $scCO_2$.

In one embodiment, the dispersing step further includes addition of a co-solvent to the pressure chamber with the solute and the fluid, to enhance the solubility of a solute that is poorly soluble in the supercritical fluid.

The average particle size of the nanoparticles obtained by the method of the present invention is generally in the range from about 1 nm to about 1000 nm, in one embodiment, in the range from about 50 nm to about 500 nm, and in another embodiment, from about 100 nm to about 500 nm, and in another embodiment, in the range from about 200 nm to about 300 nm. Of course, particles larger than 1000 nm can also be produced, if needed, but the general purpose of the present invention it to produce nanoparticles, particularly in the range from about 200 nm to about 500 nm. It is noted that it can be difficult to measure particle sizes in the range the nanoparticles are created by the present invention, and it is to be understood that the majority of the nanoparticles, and in some embodiments, the average particles sizes, will be within foregoing ranges, but some may fall outside the respective range.

A non-limiting list of examples of organic substances, including, e.g., biologically active materials, to which the present invention may be applicable, include analgesics, antagonists, anti-inflammatory agents, anthelmintics, anti-anginal agents, antiarrhythmic agents, antibiotics, anticholesterols, anticoagulants, anticonvulsants, antidepressants, antidiabetic agents, antiepileptics, antigonadotropins, antihistamines, antihypertensive agents, antimuscarinic agents, antimycobacterial agents, antineoplastic agents, antipsychotic agents, immunosuppressants, antithyroid agents, antiviral agents, antifungal agents, anxiolytic sedatives, astringents, beta-adrenoceptor blocking agents, blood products and substitutes, anti-cancer agents, cardiacinotropic agents, contrast media, corticosterioids, cough suppressants, diuretics, dopaminergics, hemostatics, immunosuppressive and immunoactive agents, lipid regulating agents, muscle relaxants, parasympathomimetics, parathyroid calcitonin and biphosphonates, prostaglandins, radiopharmaceuticals, steroids, anti-allergic agents, stimulants and anorexics, sympathomimetics, thyroid agents, vasodilators, neuron blocking agents, anticholinergic and cholinomimetic agents, antimuscarinic and muscarinic agents, vitamins, and xanthines.

According to one embodiment of the invention, liquid $CO_2$ is transferred from a supply container to a high pressure chamber using a high pressure pump. The liquid $CO_2$ is pumped to the pressure required to form and maintain a supercritical state in the pressure chamber ($\geq 1074$ PSI, $\geq 7405$ Kilopascals (Kpa)) and temperature ($\geq 304.12°$ K., $\geq 30.96°$ C.). In one embodiment, when the fluid is $CO_2$, the pressure in the pressure chamber containing the fluid in a supercritical state is in the range from about 2500 to about 3000 PSI, which is equivalent to about 17237 Kpa to about 20684 Kpa, and the temperature is in the range from about 45° C. to about 55° C., which is equivalent to about 318° K. to about 328° K. The solute substance, such as a drug molecule, is introduced to the high pressure chamber followed by admixing with the $scCO_2$ to form a fluid in a supercritical state, which contains the solute. Due to characteristics of the supercritical state, only a small amount of mixing is needed to form a homogenous mixture, and this can be ensured by using, e.g., a magnetic stirrer or a mechanical stirrer. The system pressure can be monitored with an internal pressure gauge on the pressure pump or in the high pressure chamber, whereas the temperature can be monitored with a thermocouple and/or a thermometer immersed in the high pressure chamber. The pressure chamber is preferably equipped with a temperature control device and pressure control device and is either coated with an insulating material or has a jacket to maintain the temperature and help to contain the pressure.

In accordance with an embodiment of the present invention, the system further includes an apparatus for reducing the temperature of the fluid and any of the optional co-solvent contained in the supercritical fluid to a temperature below which both the fluid and the optional co-solvent will form a solid, i.e., below the freezing point of both the fluid and the co-solvent when the fluid and solute are released from the high pressure chamber. As the supercritical fluid and the nanoparticles are released from the pressure chamber, the pressure falls and the nanoparticles are formed, these are cooled to a temperature below the freezing points of the fluid and any co-solvent, whereby the fluid forms solid "snow". Preferably, the snow separates from the nanoparticles. The system includes a suitable surface upon which the snow and nanoparticles may be deposited. The suitable surface upon which the snow and nanoparticles are deposited include, e.g., an endless conveyor which can move the deposited solids away from the deposition point or area to an area in which the solidified fluid, e.g., the $CO_2$ snow, will sublime or evaporate away, and in which any co-solvent will also evaporate away, leaving behind the nanoparticles on the surface. The suitable surface, in another embodiment, may be a drum large enough to allow movement similar to the conveyor. In another embodiment, the suitable surface may simply be a stationary surface, which may be suitable for batch-wise operation of the process of the present invention. Then, the nanoparticles are recovered from the surface by a process such as scraping, suction, electrostatic attraction, or other suitable methods known in the art for collecting and handling nanoparticles.

Referring now to the drawings, two example embodiments of systems and processes in accordance with the present invention are provided.

In FIG. 1, a high pressure chamber with the $scCO_2$ (or other supercritical fluid) is shown, with feed ports for the solute, the fluid and the optional co-solvent. The contents of the pressure chamber may be mixed by a suitable mixing device (not shown). The pressure chamber further includes an exit port communicating with an exit port line. The solute, the optional co-solvent and the fluid are provided to the pressure chamber via suitable lines and high pressure pumps or source, and are mixed in the high pressure chamber to form a dispersion of the solute, optional co-solvent and supercritical fluid.

In a continuous system, these ingredients are provided to the pressure chamber on a continuous, steady-state basis, as needed to maintain the supercritical conditions in the pressure chamber and to maintain the desired concentration of the solute, the co-solvent, if any, and the supercritical fluid in the dispersion.

The exit port line includes a suitable flow control valve, used to regulate flow of the dispersion out of the pressure chamber and into an exit line. In the exit line, the nanoparticles form, still dispersed in the $CO_2$, which may be in transition from the supercritical state. In this embodiment, the exit port line moves through a cold nozzle or jacket, e.g., a liquid nitrogen cooled jacket, or a liquid nitrogen cooled nozzle, through which the dispersion passes. Due to the very low temperature in the cold jacket, the $CO_2$ solidifies into a "snow", and as this mixture exits the exit port line downstream of the flow control valve, both the thus-formed snow and the nanoparticles are deposited onto or collected upon a conveyor. On the conveyor, as the conveyor moves away from the nozzle, the formerly solidified supercritical fluid sublimes and any co-solvent evaporates, as the conveyor moves the remaining snow and nanoparticles away from the site at which the snow and nanoparticles were deposited. At the far end of the conveyor, a scraper or other suitable nanoparticle collection device is arranged to separate the nanoparticles from the conveyor surface. The nanoparticles are removed from the conveyor by the scraper or other suitable device and are collected by a suitable collection device. One such collection device may be a second scraper or wiper blade that moves across the scraper, perpendicular to the direction of the conveyor. Other suitable collection devices may include a reduced pressure collector, which would suck up the nanoparticles into a suitable container, or may be an electrostatic device having a surface to which the nanoparticles cling and collect upon. As depicted in FIG. 1, in this embodiment, the conveyor is continuously moving, so that after the nanoparticles are removed, the conveyor moves from the nanoparticle collection end back towards the deposition end, where the snow and nanoparticles are deposited.

In one embodiment, the apparatus of FIG. 1 may further include a source of heat in the downstream area of the conveyor, which may be used to add heat to assist in the sublimation and/or evaporation of the fluid and any optional co-solvent that may be present.

Figure 2:
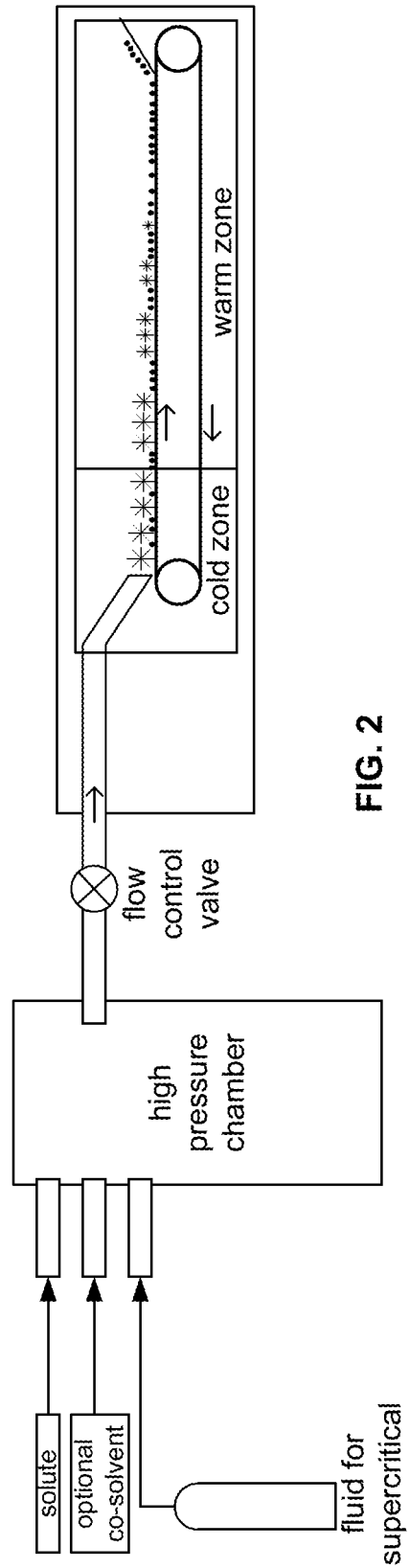
FIG. 2 is a schematic diagram depicting elements of an apparatus for carrying out another embodiment of the present invention.

Referring to FIG. 2, in this drawing, the feed ports, the high pressure chamber, and the exit port line and flow control valve are the substantially same as in the FIG. 1 drawing, but the exit line downstream from the flow control valve leads into a collection apparatus having a cold zone which lowers the temperature of the exiting dispersion as the nanoparticles form, and directs the nanoparticles and the cooled fluid onto a cold surface of the conveyor. In this embodiment, the nanoparticles form as the supercritical fluid transitions from the supercritical state similar to the embodiment of FIG. 1. In this embodiment, a cooling agent, e.g., liquid nitrogen, is used to reduce the temperature of the nanoparticles and fluid, by forming a cold zone and making the conveyor surface very cold. As the nanoparticles and the fluid are cooled, the snow forms and is deposited with the nanoparticles on the conveyor surface, similar to the embodiment of FIG. 1. The conveyor then moves, together with the snow and nanoparticles to a warm zone, in which the fluid, e.g., $CO_2$, sublimes or evaporates, and any co-solvent evaporates. The warm zone may be suitably heated to allow the fluid and any co-solvent to reach a temperature at which it will sublime or evaporate, by using, e.g., an infrared or other suitable heater. A collection device such as the scraper as described with respect to FIG. 1 may be used, and/or a similar collection system devised. In one version of this embodiment (and of the embodiment of FIG. 1), the conveyor may be made of a material with a low heat capacity, so that it will not retain a significant amount of heat, which will facilitate both the cool down in the cold zone, and will not require input of a large quantity of heat in the warm zone to warm sufficiently to allow the $CO_2$ to sublime and any co-solvent to evaporate. As depicted in FIG. 2, in this embodiment, the conveyor is continuously moving, so that after the nanoparticles are removed in the warm zone, the conveyor moves back towards the cold zone at the collection end.

In one embodiment, the apparatus of FIG. 2 may include a cold nozzle as shown and described with respect to FIG. 1. If a cold nozzle is included in this embodiment, the amount of cooling needed to create the cold zone may be reduced or eliminated.

In accordance with the present invention, the important feature of all embodiments is the cooling to result in solidification of the fluid used as the supercritical fluid, to facilitate the separation of the fluid from the produced nanoparticles.

It is noted that the mixture of solute, optional co-solvent and supercritical fluid, when in the high pressure chamber, is referred to herein generally as a dispersion. A dispersion is intended to encompass virtually any form of mixture, including a solution, a mixture, a slurry, a suspension, or any other known combination of these ingredients.

It is noted that, throughout the specification and claims, the numerical limits of the disclosed ranges and ratios may be combined, and are deemed to include all intervening values. Furthermore, all numerical values are deemed to be preceded by the modifier "about", whether or not this term is specifically stated.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. A process for producing nanoparticles of a substance, comprising:
    in a first chamber, dispersing a substance in a fluid and bringing the fluid into a supercritical state at a selected pressure and temperature to form a dispersion of the substance and the fluid in the supercritical state;
    passing the dispersion from the first chamber either through a cooling device into a second chamber or into a cooling zone in the second chamber, wherein the cooling device or cooling zone reduces the temperature of the passing dispersion below a temperature at which the fluid forms solid particles such that both solid particles of the fluid and nanoparticles of the substance are formed, wherein the second chamber further comprises a surface configured to receive the solid particles of the fluid and the nanoparticles of the substance, and both the solid particles of the fluid and the nanoparticles of the substance are deposited upon the surface together;
    wherein the surface configured to receive solid particles of the fluid and nanoparticles of the substance is further configured to transport the nanoparticles to a nanoparticle collection zone;
    moving the surface towards the nanoparticle collection zone, wherein, as the surface moves towards the nanoparticle collection zone, allowing at least one of pressure to decrease and temperature to increase such that the solid particles of the fluid deposited on the surface are transformed into a gaseous state, and removing the fluid in the gaseous state while the nanoparticles of the substance remain on the surface; and collecting the nanoparticles of the substance from the surface in the nanoparticle collection zone.

2. The process of claim 1 wherein the dispersing further comprises adding a co-solvent to enhance solubility of the substance in the fluid.

3. The process of claim 2 wherein in the passing, the temperature of the dispersion is reduced below the temperature at which the co-solvent forms a solid.

4. The process of claim 3 wherein in the allowing, the co-solvent evaporates and is removed with the fluid in the gaseous state.

5. The process of claim 1 wherein the surface is disposed upon an endless conveyor or a rotatable drum.

6. The process of claim 1 wherein the collecting comprises scraping the nanoparticles from the surface or lifting the nanoparticles from the surface by suction or electrostatic attraction.

7. The process of claim 1 wherein the process is operated on a continuous basis.

8. The process of claim 1 in which the fluid is carbon dioxide.

9. The process of claim 1 wherein the process is free of any step of filtration to collect the nanoparticles.

10. The process of claim 1 wherein the process is free of any added surface modifier in any step of the process.

11. The process of claim 1 wherein the process is free of any added antisolvent in any step of the process.

12. The process of claim 1 wherein the nanoparticles of the substance have an average size in the range from about 1 nm to about 1000 nm.

13. The process of claim 1 wherein the nanoparticles of the substance have an average size in the range from about 50 nm to about 500 nm.

14. The process of claim 1 wherein the nanoparticles of the substance have an average size in the range from about 200 nm to about 300 nm.

* * * * *